April 6, 1965   G. A. HENDERSON   3,176,732
CIRCULAR SAW
Filed Sept. 25, 1961
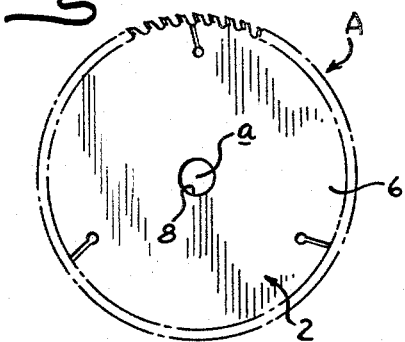
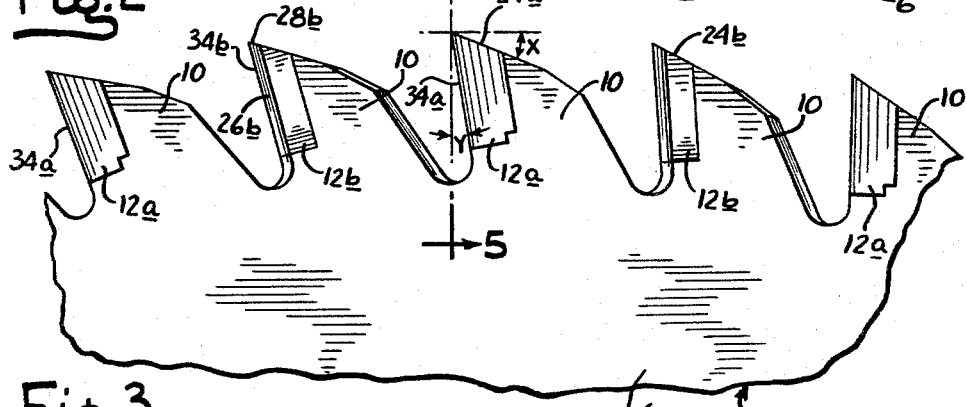
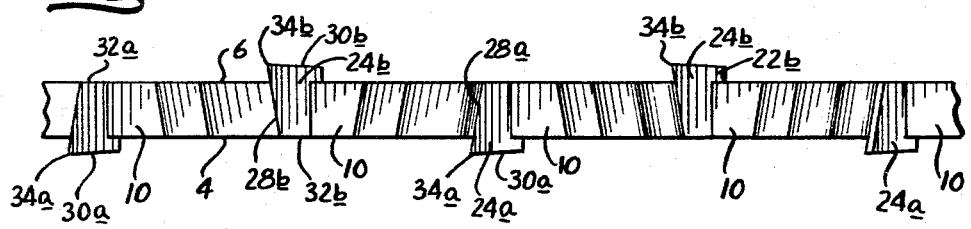
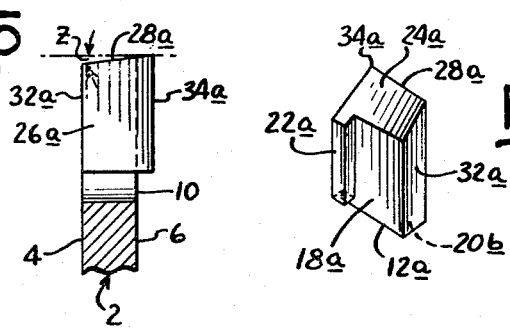
INVENTOR.
GEORGE A. HENDERSON
BY Morris Spector
ATTY.

United States Patent Office

3,176,732
Patented Apr. 6, 1965

3,176,732
CIRCULAR SAW
George A. Henderson, 1807 N. California Ave.,
Chicago, Ill.
Filed Sept. 25, 1961, Ser. No. 140,329
2 Claims. (Cl. 143—133)

This invention relates to improvements in inserted tooth circular saws.

In circular saws of the inserted tooth type used for sawing gypsum board, it is a common practice to make the corresponding cutting edges of all of the teeth facing in the same direction. These teeth include a lateral cutting edge on only one side of the saw body and a peripheral cutting edge that forms an acute angle therewith. The opposite lateral edges of the teeth which are at the other side of the saw body do not have cutting edges. The lateral cutting edges define one surface of revolution that is axially spaced from one side of the saw body while the other, or non-cutting edges form another surface of revolution, the two surfaces of revolution constituting the kerf of the saw. When the saw cuts during rotation thereof, the fact that the corresponding cutting edges of all of the teeth are oriented in the same direction creates lateral reaction forces tending to bend or flex the saw from its desired course.

It is an object of the present invention to provide a circular saw having inserted saw teeth in which the cutting edges are presented in a manner to equalize the lateral forces on the saw during cutting.

It is also an object of the present invention to provide a saw of the type stated in which one group of teeth constituting alternate teeth have the same presentation of their cutting edges while intervening alternate teeth have their cutting edges oppositely presented. The lateral reaction forces on the respective groups are therefore equal and oppose each other.

The attainment of the above and further objects of the present invention will be apparent from the following specification taken in conjunction with the accompanying drawing forming a part thereof.

In the drawing:

FIG. 1 is a side elevational view of a circular saw constructed in accordance with and embodying the present invention;

FIG. 2 is a fragmentary elevational view, on an enlarged scale, of a portion of the saw of FIG. 1 and showing several of the teeth thereon;

FIG. 3 is a fragmentary top plan view of the portion of the saw shown in FIG. 2;

FIG. 4 is a fragmentary exploded elevational view of a portion of the structure of FIG. 2;

FIG. 5 is a fragmentary sectional view taken along line 5—5 of FIG. 2; and

FIG. 6 is a perspective view of one of the inserted saw teeth which form part of the present invention.

Referring now in more detail to the drawing which illustrates a preferred embodiment of the present invention, A designates a circular saw which is particularly useful for sawing gypsum board. The saw comprises a flat disk-like saw body 2 having opposite parallel sides 4, 6 which are perpendicular to the axis of rotation $a$ of the saw body 2. Formed in the saw body 2 and surrounding the axis $a$ is a hole 8 by which the saw may be mounted on the saw arbor of the machine that drives the saw.

Integrally formed on the periphery of the saw body and extending completely therearound is a plurality of circumferentially spaced tooth-backing elements 10, and mounted on the tooth-backing elements 10 is a plurality of inserted saw teeth 12a, 12b. The saw teeth 12a, 12b may be formed of tungsten carbide steel. Furthermore, the teeth 12a, 12b are substantially mirror images of each other. The corresponding parts of the teeth are indicated with the same reference numerals but with the appropriate subscripts $a$ or $b$. Each tooth backing element 10 is formed with adjacent circumferential and outwardly extending shoulders 14, 16 which are sized for flush fitting reception of similarly shaped rear and bottom surfaces 18a, 18b, 20a, 20b which are on the teeth 12a, 12b. Also formed on the teeth 12a, 12b are rearwardly directed flanges 22a, 22b which lie flush against the sides of the tooth backing element 10. The teeth 12a, 12b may be secured to the backing elements 10 in any suitable manner, as for instance, by brazing.

Formed on the teeth 12a, 12b are end surfaces 24a, 24b which are inclined to provide a bottom rake angle X. The teeth also have front surfaces 26a, 26b, which are presented toward the adjacent forward backing element and lie in a plane which is at an acute angle to the mid-plane of the saw body 2. The front surfaces 26a, 26b also form at an acute top rake angle Y with a plane perpendicular to the work being cut and also perpendicular to the direction of feed of the work. The end surface and front face of each tooth intersect at an acute angle to form peripheral cutting edges 28a, 28b, which are inclined from one side of the tooth to the other as best seen in FIG. 5, to provide an acute side rake angle Z. The teeth 12a, 12b have opposite lateral faces 30a, 30b, 32a, 32b, the faces 30a, 30b being laterally spaced from the adjacent saw body side 4, 6 and lying at a small acute angle thereto. The lateral faces 30a, 30b intersect the front faces 26a, 26b to form lateral cutting edges 34a, 34b. The kerf of the saw will be defined by the surfaces of revolution formed by the lateral cutting edges 34a, 33b.

The teeth 12a are disposed around the periphery of the saw body 2 alternately with respect to the teeth 12b. The several cutting edges on the teeth 12a have the same presentation with respect to the saw body with the result that the cutting edges on the teeth 12a will produce like reaction forces on the saw body 2. However, the cutting edges on the teeth 12b are all similar to the corresponding cutting edges on the teeth 12a, except that they are oppositely presented with respect to the cutting edges on the teeth 12a. Consequently, the reaction forces set up by the cutting action of the teeth 12a that tend to bend the saw body 2 will be opposed by equal and opposite reaction forces that are set up as a result of the cutting action of the teeth 12b. The equalization of the lateral forces on the saw body 2 resulting from this construction assist in maintaining the saw planar and enables a greater accuracy of cut along the straight line to be made.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A circular saw comprising a flat disk-like saw body having opposite sides perpendicular to the axis of rotation of the saw body, a plurality of circumferentially spaced tooth backing elements on the periphery of the saw body and projecting radially outwardly therefrom, and an inserted saw tooth secured to each backing element, each saw tooth having a front face presented toward the adjacent forward backing element and lying in a plane which is at an angle to the sides of the body, each said tooth also having an end surface and lateral faces, only one of the lateral faces having a flange which projects axially beyond one side of the saw body and bears against said one side of the saw body, the front face, end surface and lateral faces of each tooth intersecting to form a lateral cutting edge and a peripheral cutting edge, the lateral cutting edges of alternate teeth lying axially outwardly of one side of the saw body and the lateral cutting edges of the remaining alternate teeth lying axially outwardly of the other side of the saw body, the lateral cutting edges of the teeth of each group that constitutes alternate teeth defining opposed surfaces of revolution axially outwardly of the opposite sides of the saw body and forming the kerf of the saw.

2. A circular saw comprising a flat disk-like saw body having opposite sides and a mid-plane between the opposite sides and perpendicular to the axis of rotation of the saw body, a plurality of circumferentially spaced tooth backing elements on the periphery of the saw body and projecting radially outwardly therefrom, and an inserted saw tooth secured to each backing element, each saw tooth having a front face presented toward the adjacent forward backing element and lying in a plane which is at an angle to the mid-plane of the body, each said tooth also having lateral faces, only one of the lateral faces having a flange which projects axially beyond one side of the saw body and bears against said one side of the saw body, the front and lateral faces of the tooth intersecting to form a lateral cutting edge, the lateral cutting edges of a group of teeth lying axially outwardly of one side of the saw body and the lateral cutting edges of another group of teeth lying axially outwardly of the other side of the saw body, the lateral cutting edges of the teeth that constitutes each group defining opposed surfaces of revolution axially outwardly of the opposite sides of the saw body and forming the kerf of the saw.

References Cited by the Examiner
UNITED STATES PATENTS

| | | | |
|---|---|---|---|
| 2,528,226 | 10/50 | Hidebrant | 143—133 |
| 2,600,272 | 6/52 | Segal | 143—133 |
| 3,048,207 | 8/62 | Ferrari | 143—133 |

FOREIGN PATENTS

| | | |
|---|---|---|
| 617,615 | 8/35 | Germany. |
| 537,764 | 7/41 | Great Britain. |

WILLIAM W. DYER, Jr., *Primary Examiner.*

MORRIS M. FRITZ, WALTER A. SCHEEL, *Examiners.*